(12) United States Patent
Jackson

(10) Patent No.: US 9,452,538 B2
(45) Date of Patent: Sep. 27, 2016

(54) SELECTIVELY MODIFIABLE LAYER FOR ALTERATION OF APPEARANCE OR TEXTURE

(71) Applicant: Disney Enterprises, Inc., Burbank, CA (US)

(72) Inventor: Philip Jackson, Glendale, CA (US)

(73) Assignee: DISNEY ENTERPRISES, INC., Burbank, CA (US)

(*) Notice: Subject to any disclaimer, the term of this patent is extended or adjusted under 35 U.S.C. 154(b) by 635 days.

(21) Appl. No.: 13/799,571

(22) Filed: Mar. 13, 2013

(65) Prior Publication Data

US 2014/0270906 A1  Sep. 18, 2014

(51) Int. Cl.
| | | |
|---|---|---|
| *F01B 19/00* | (2006.01) |
| *B25J 19/00* | (2006.01) |
| *A63H 9/00* | (2006.01) |
| *A63G 7/00* | (2006.01) |
| *F15B 15/10* | (2006.01) |

(52) U.S. Cl.
CPC ............ *B25J 19/00* (2013.01); *A63G 7/00* (2013.01); *A63H 9/00* (2013.01); *F15B 15/10* (2013.01); *Y10T 137/0396* (2015.04); *Y10T 403/25* (2015.01)

(58) Field of Classification Search
CPC ...... F15B 15/10; F15B 15/103; A63H 3/365
See application file for complete search history.

(56) References Cited

U.S. PATENT DOCUMENTS

| | | | | |
|---|---|---|---|---|
| 5,664,983 A | * | 9/1997 | Hollis | .............. 446/199 |
| 5,696,892 A | | 12/1997 | Redmann et al. | |
| 6,805,606 B1 | * | 10/2004 | Kellum | .............. 446/176 |
| 7,572,166 B2 | * | 8/2009 | Blum et al. | .............. 446/6 |
| 7,707,001 B2 | | 4/2010 | Obinata et al. | |
| 2010/0253650 A1 | | 10/2010 | Dietzel et al. | |

OTHER PUBLICATIONS

Author Unknown, Tachilab GelForce Project Description, Webpage found at http://tachilab.org/gelforce/project.htm, date unknown, 1 page.

* cited by examiner

*Primary Examiner* — Thomas E Lazo
*Assistant Examiner* — Daniel Collins
(74) *Attorney, Agent, or Firm* — Dorsey & Whitney LLP

(57) ABSTRACT

A movable robotic structure including a frame or substrate, an outer skin connected to at least a portion of the frame and a vacuum source in fluid communication with the outer skin. The vacuum source, such as a vacuum pump, is activated to pull the outer skin into engagement with an outer surface of the frame. When pulled by the vacuum source, the skin may conform to the topography or texture of the frame, as well as become taut over at least a portion of the frame.

16 Claims, 15 Drawing Sheets

SELECTIVELY MODIFIABLE LAYER FOR ALTERATION OF APPEARANCE OR TEXTURE

TECHNICAL FIELD

The present invention relates generally to robotics, and more specifically to methods and techniques for creating a more realistic outward appearance for robotic structures.

BACKGROUND

Robots, such as Audio-Animatronics by Walt Disney, Co., are used at theme parks, restaurants, movies, and so on. Many robots may be configured to replicate a person, character, animal, or the like. Often, movable robots may be used as an interactive display for people at a theme park, where the movable robots may have articulable elements, such as arms, that move, and may employ sound, such as talking. As another example, robots may be used to create life-like characters for films or television shows.

Some robots or movable mannequins may include a "skin" or outer cosmetic layer configured to replicate a particular character, animal, person, or the like. As a specific example, a robot may include skin, clothing, hair, and the like to replicate a character from a movie, book, or television show. Often, the skin or clothing may be attached to or form a structure that provides the "skeleton" or frame for the robot. The frame or substrate may also include movable joints to allow selective movement of the robot. For example, the robot may have a mouth that moves up and down while an audio recording is played to simulate that the robot is speaking. The skin or cosmetic outer structure may be dimensioned to accommodate the movement range of the robot. As an example, a knee joint for a robot may include a sufficient length of skin so that the skin will allow the leg to extend and retract at the knee joint. However, often this excess skin or material may appear "loose" or baggy in certain positions. This excess skin may detract from the appearance of the robot, may reduce the similarity of the robot and the desired character or person the robot is designed to replicate, and may also hinder movement of the robot. Additionally, the excess skin may become caught in between the joints, preventing movement or limiting the range of movement of the robot.

SUMMARY

Some examples described herein include a movable robotic structure including a frame, an outer skin connected to at least a portion of the frame and a vacuum source in fluid communication with the outer skin. The vacuum source, such as a vacuum pump, is activated to pull the outer skin into engagement with an outer surface of the frame. When pulled by the vacuum source, the skin may conform to the topography or texture of the frame, as well as become taut over at least a portion of the frame.

In some examples, the frame of the movable robotic structure includes a joint movable in at least one direction. In these examples, the outer skin is connected to and covers the joint.

In activating the vacuum source, the vacuum source causes the outer skin to conform to a surface of the frame. In some examples, the frame may be at least partially flexible or may be substantially rigid. Additionally, activating the vacuum source may define a localized outer feature on the skin. The frame may also include at least one recess and/or at least one ridge.

In some examples, the frame has a non-planar surface and may include a plurality of recesses. Additionally, in some implementations, while the vacuum is activated, at least a portion of the flexible material conforms to the shape of the frame. The frame may also be at least partially flexible.

In some instances, activating the vacuum in the movable robotic structure causes the flexible material to be drawn into a recess formed in the frame or vacuum substrate.

In other examples, the flow apertures within the frame or substrate vary in diameter from one surface of the vacuum substrate to a second surface of the frame. Additionally, the substrate or frame may further include a seal base, where the vacuum cavity is defined in part by the seal base and the seal base defines a flow path between the vacuum cavity and the vacuum.

Other examples include a vacuum control mechanism. The vacuum control mechanism includes a porous substrate having a first surface and a bottom surface, a membrane extending over at least a portion of the first surface, and a pump in fluid communication with the membrane and configured to produce a suction force. The suction forces acts to pull the membrane closer to the first surface of the porous substrate.

Yet other examples include a method for vary a topography of a material. The method includes mounting a substantially flexible material to a vacuum support shell, the support shell comprises a plurality of flow apertures defined therein and selectively activating a vacuum in fluid communication with the flow apertures, wherein activating the vacuum causes a pressure change in the support shell.

In the method for varying a topography of a material, the porous substrate includes a plurality of pores defined therein, at least one of the plurality of pores provides a fluid communication pathway between the pump and the membrane. In the method, the suction force forces the membrane to follow a topography of the porous substrate. In some examples, the topography may include at least one recess and/or at least one ridge.

Additionally, in some implementations, a coating may be applied to the outer surface of the membrane.

SPECIFICATION

Overview

Figure 1A:
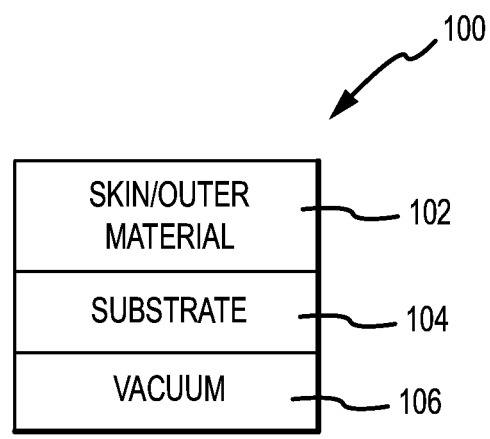
FIG. 1A is a simplified block diagram of a vacuum control mechanism.

Some examples described herein disclose a method and apparatus for movably connecting a flexible material layer, such as a skin or other similar membrane layer, to a movable element on a robot. The method and apparatus may also be used to vary the topography, texture, and/or appearance of the flexible skin or membrane by selectively controlling the movement of the membrane relative to the substrate. In one example, differential pressure, such as the application of a vacuum, may be used. The differential pressure may be selectively varied to adjust the attachment force applied between the membrane and the substrate. Additionally, applying different pressure differentials to different portions of the membrane may define localized variations in the topography or texture of the membrane. These localized variations may be used to define discrete features, such as dimples, wrinkles, or the like, on the movable structure. Additionally, the localized variations may be applied at predetermined locations to prevent the skin from hindering movement of the movable structure.

In one example, the membrane may take the form of a skin positioned over a substrate in order to appear as a life-like animatronic object, such as a person. The substrate may include a plurality of apertures fluidly connected to a vacuum source. The skin may be applied to an outer surface of the substrate and may cover at least a portion of the apertures. When activated, the vacuum source varies a pressure experienced by the skin material and pulls the skin against the outer surface of the substrate. This suction, or pulling force, tensions the skin against the substrate and in instances where the substrate may be contoured or textured, the skin may generally conform to those underlying shapes. The suction force may be varied by varying the power of the vacuum source, as well as changing the shape, diameter, and/or density of the flow apertures formed in the substrate. Additionally, the suction force may be varied by including "leaks" or other apertures that may reduce the seal in a vacuum cavity. For example, the skin may include apertures that may reduce a seal between the skin and the substrate (which may define a vacuum cavity).

The substrate may be substantially any shape and may include a frame including a number of elements interconnected by movable or articulating joints to form a structure having at least one moving element. For example, the substrate may form the skeleton of the movable structure and define a character, person, animal, or the like, and may include one or more legs, arms, tentacles, apertures (e.g., mouths), and so on. The skin may be connected to the substrate in a manner that may allow one or more portions of the skin to move relative to the substrate. A vacuum chamber is positioned operably relative to the substrate, and apertures are formed through or around the substrate to expose the vacuum chamber to the skin. When the vacuum is activated, the skin may be pulled towards the apertures and against the substrate. By selectively activating the vacuum, the skin may be selectively and adjustably secured to the substrate, which may allow the movement of the articulating elements while keeping the skin taught relative to the substrate and control the appearance of loose or baggy portions of the skin. The vacuum may be programmed to activate in response to a particular desired output and may be discretely activated or may be programmed to be activated in according to a particular pattern or rhythm.

In other examples, the substrate may form a user engagement surface. For example, the substrate may form a seat, arm rest, handrail, table, or the like. In these examples, the flexible material or membrane may form an outer layer or an intermediate layer that may be positioned against the substrate. The substrate may include the flow apertures that are fluidly connected to the vacuum. By activating the vacuum, the membrane or skin may be pulled against the substrate, which may vary a user experience. For example, the substrate may include a textured outer surface and the membrane may transition from a relatively smooth surface to a textured surface when the vacuum is activated. In this example, the membrane may define the engagement surface and the user may experience a change in texture. This change in textured can be correlated to haptic feedback for a user (e.g., feedback or interactions with an amusement ride, video game, or the like).

The apertures are positioned in or around the substrate, and may be a characteristic of the material from which the substrate is made, or may be defined in the material of which the substrate is made. Thus, the substrate may be substantially porous, allowing molecules, such as air, to be transmitted therethrough. The apertures in the substrate allow the substrate to be positioned between the skin and the vacuum chamber, while allowing the suction force of the vacuum to be applied to the skin.

The membrane layer or skin may be solid or porous or a combination. Generally, the membrane may be a flexible material that may stretch in one or more directions. For example, the skin may be plastic, nylon, wove or non-woven material, may be a single material or a combination of different materials laminated or otherwise connected together. Similarly, the skin may be in sheet form and substantially planar, or may be pre-formed or contoured to match one or more contours of the substrate. Additionally, the skin may include elements, such as structural portions, which may not be flexible, but are controlled by the surrounding sheet or flexible material. As some examples, fingernails (or elements configured to appear as fingernails) may extend from the skin and may be substantially rigid, but may be controlled by the skin. The skin may also include a tang or tail that may have an increased durometer compared to the other portions of the skin. In these examples, the tang may experience a majority of the suction force by the vacuum pump and may allow for higher repeatability due to its increased strength and durability.

DETAILED DESCRIPTION

Figure 1B:
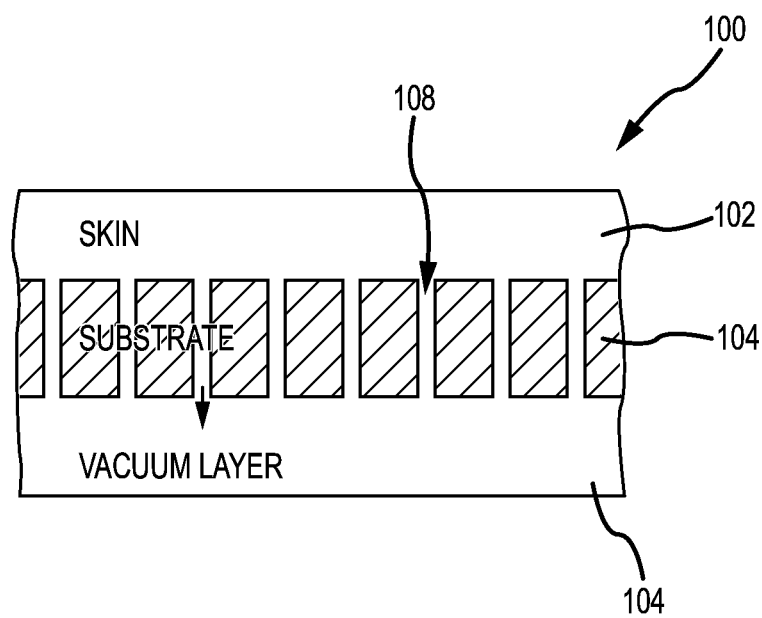
FIG. 1B is an enlarged cross-section view of the vacuum control mechanism of FIG. 1A.

Turning to the figures, a simplified representation of an object including the vacuum control mechanism described herein will now be discussed. FIG. 1A is a simplified block diagram of the vacuum control mechanism showing skin applied on the opposite side of the frame or substrate from a vacuum. FIG. 1B is an enlarged cross-section view of the vacuum control mechanism of FIG. 1A. With reference to FIGS. 1A and 1B, the vacuum control mechanism 100 may include a skin 102 or membrane, a substrate 104 or frame, and a vacuum 106. As will be discussed in more detail below, the vacuum may include a chamber or cavity (which may be defined by the substrate) and a pump that provides suction force.

The vacuum control mechanism 100 may be incorporated into a number of different applications, structures, and features. As some examples, the vacuum control mechanism 100 may be used in animatronic characters, robots or movable structures, seating elements, handrails, table tops or work surfaces, and the like. Examples of applications for the vacuum control mechanism 100 will be discussed in more detail below.

In some examples, the skin 102 may form an outer or finishing element for the vacuum control mechanism. In other examples, the skin may form an intermediate layer and could be buried or partially covered by other materials, such as clothing, hair, fur, or the like. In these examples, the skin may control movement of select features, with the exterior materials (e.g., clothing) being moved by the skin.

The substrate 104 may form a shell or skeleton that supports the skin 102 and provides a structure for the shape of the skin 102. Additionally, in some examples, the substrate 104 may define a vacuum cavity or chamber. As will be discussed in more detail, the vacuum cavity defines an area where vacuum pressure from the vacuum pump is applied through the substrate to the selected portion of the skin. The vacuum pump may be used to vary the engagement of the skin 102 with the substrate 104, as well as the appearance and/or topography of the skin 102.

The skin 102 may be a membrane or other outer element that is positioned relative to the substrate 104. In many examples, the skin 102 may be a relatively flexible and resilient material. The skin 102 may be configured such that when a force is applied thereto, the skin can be pulled or pressured to conform to certain shapes or structures and when the force is removed, resiliently return to an original shape. As some examples, the skin 102 may be an elastomer, such as silicone and urethane, polyurethane, a foam rubber (e.g., compound created by mixing latex with air), vinyl, or the like.

The skin 102 may be dyed, textured, or include one or more overlays or coatings. In many instances, an outer surface of the skin 102 may be modified to match or replicate a particular material. In other words, the skin 102 may modifiable by the user to create a desired aesthetic appearance. Additionally, the skin may be a single material or a combination of materials layered in a lamina, or otherwise connected or blended together, and may be planar or contoured. Although the skin may be mostly flexibly, the skin may also include one or more rigid portions that may provide stiffness or structure to the skin. For example, the skin may include a tail or tang portion that may have an increased durometer as compared to other portions of the skin. The tang may be formed integrally with the skin, such as being bonded during a formation process, or may be connected to the skin in other manners (e.g., adhesives or the like). The tang may be positioned on the skin in areas where a localized vacuum may be applied and due to the increase durometer (as compared to the other areas of the skin), the tang may provide for reduced wear and tear and increased repeatability. In some examples, the skin may have a 00 Shore A to A15 durometer rating whereas the tang may have a durometer ranging between 40 and 65 A, An illustrative tang will be discussed in more detail below with respect to FIGS. 12C and 12D.

Figure 2:
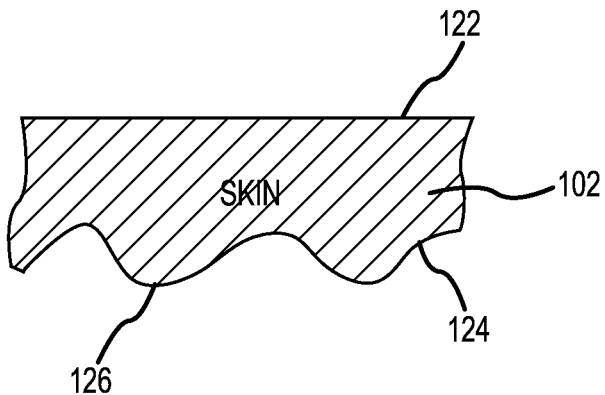
FIG. 2 is a diagram of one example of skin that may be used with the vacuum control mechanism.

The skin 102 may be substantially any shape and in many instances may be configured to generally conform to a shape of the substrate 104. FIG. 2 is a diagram of one example of the skin 102. With reference to FIG. 2, the skin 102 may include a top surface 122 and a bottom surface 124. Often, the top surface 122 may be an outer surface of the vacuum control mechanism 100 that may be exposed or visible to users. Additionally, the top surface 122 may be smooth, textured, or a combination of smooth and textured. In this way, the skin 102 may be configured to replicate the appearance and feel of a desired replication target. However, as discussed above, in some instances, the skin may form an intermediate layer and be partially or completely covered with another material that may form the external layer for the vacuum control mechanism 100. Additionally, as will be discussed in more detail below, the skin 102 may be modified by pressure applied by the vacuum 106 and the substrate 104, such that the top surface 122 of the skin 102 may change texture or appearance when selectively modified by the vacuum pump 106.

The bottom surface 124 of the skin may be similar to the top surface 122 and may be smooth, rough or textured, or a combination. In some examples, such as the example, illustrated in FIG. 2, the skin 102 may include one or more ridges 126 on the bottom surface 124. The ridges 126 may reduce the coefficient of friction or the engagement between the substrate 104 and the skin 102 when the vacuum pump 106 is activated. Additionally, the materials and/or texture of the skin may alter the effects of the vacuum pressure on that portion of skin. This will be discussed in more detail below. Briefly, however, by changing the texture of the skin engaged with the substrate, the engagement between the substrate and the skin may not be sealed, which may reduce the effect of the suction force of the vacuum on the skin.

With reference again to FIGS. 1A and 1B, the vacuum pump 106 is a vacuum pressure source configured to create a vacuum or a partially vacuum. The vacuum pump 106 is connected to a vacuum cavity which may be defined by the substrate or a coupling member connected to the substrate and the vacuum pump 106. The vacuum pump may be configured to pull the air or gas molecules from the cavity, as well as any space between the skin and the substrate to draw the skin to the substrate where the vacuum is applied.

For example, the vacuum pump 106 may pull air molecules through the flow apertures 108 in the frame towards the vacuum pump 106, creating a vacuum. The vacuum pump 106 may be a positive displacement pump which may selectively expand a cavity, a momentum transfer pump or molecular pump which may use jets of dense fluid or rotating blades, or an entrapment pump to capture gases. However, the above examples are illustrative only and many other types of pumps are envisioned. Additionally, it should be noted that the vacuum control mechanism may include two or more vacuum pumps that may be activated separately or jointly from one another and to common or discrete areas. For example, one pump may be selected to provide a suction force to a first area of skin and one pump may be selected to provide a suction force to a second area of skin. As a specific implementation, the vacuum control mechanism may include a uniform vacuum pump that may exert a generally uniform suction force on the skin to hold the skin to the substrate and a localized vacuum source that may be configured to exert a localized suction force on one portion of the skin. This may be used to create a face on a robot, where the uniform vacuum holds the skin to the substrate defining the facial features and the localized vacuum selectively defines wrinkles or dimples in the skin of the face.

In some embodiments, the vacuum pump 106 may be electronically activated and in other embodiments the vacuum pump 106 may be manually or mechanically activated. As one example, the vacuum pump 106 may include a crank attached to a bellows and the bellows may be configured to exert a suction force when actuated by the crank. The crank or other mechanical element may be configured to be operated by a person or a machine. As a specific example, the vacuum control mechanism may be incorporated into a toy, such as a doll or stuffed animal, and a user may actuate a hand driven vacuum pump to vary one or more features of the toy (such as facial features, wrinkles, etc.).

The substrate 104 provides a support structure for the skin 102 and the skin 102 may generally conform to the shape of the substrate 104. The substrate 104 may also form one or more portions of a structural element, such as an animatronic robot, toys (e.g., dolls, replica automobiles, etc.), a movable statute, a chair, or the like. For example, the substrate 104 may form the frame or skeleton of an object, such as a robot, chair, table, or the like. Depending on the desired use of the vacuum control mechanism or the desired object to be created, the substrate may be rigid, partially rigid, or flexible.

The substrate 104 may be substantially any type of material, some example materials include plastics, metal alloys, fiberglass, selective laser sintering, composites (carbon fiber reinforced plastic), or the like. In some examples, the substrate 104 may also be flexible and be constructed of an elastomeric or rubber material. In these examples, the substrate 104 may be flexible. The substrate 104 may be configured to provide a shape or structure for the vacuum control mechanism and may include one or more movable components or parts. For example, the substrate 104 may include one or more joints that may be movable in one or more directions.

Figure 3A:
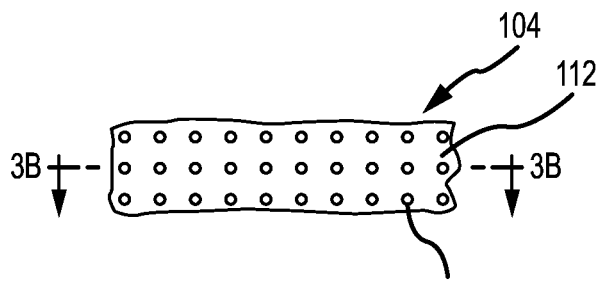
FIG. 3A is a top plan view of the frame of the vacuum control mechanism.
Figure 3B:
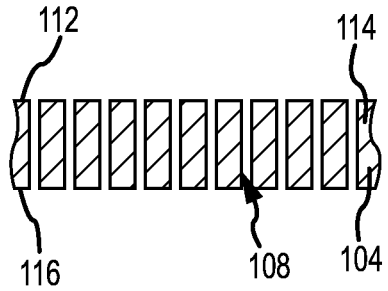
FIG. 3B is a cross-section of the frame taken along line 3B-3B in FIG. 3A.

The substrate 104 may be generally porous and air molecules may be transmitted therethrough. FIG. 3A is a top plan view of the frame. FIG. 3B is a cross-section of the frame taken along line 3B-3B in FIG. 3A. With reference to FIGS. 3A and 3B, the substrate 104 may include a body 114 having a top surface 112 and a bottom surface 116 with a plurality of flow apertures 108 defined therein. The thickness of the substrate 104 may be modified as desired and, in some instances, the thickness of the frame may vary from one end of the frame to another end.

The flow apertures 108 may extend through the entire thickness or height of the substrate 104, e.g., between the top and bottom surfaces. The flow apertures 108 or pores may be defined in the substrate 104 or may be integrally formed as characteristic of the material of the substrate 104. For example, the substrate 104 may be created with a generally porous material and the flow apertures 108 may be defined through the material's structure. Alternatively or additionally, the flow apertures 108 may be defined in the substrate 104 by a laser, etching, machining, electrical discharge machining, or the like. The flow apertures 108 may also be defined as the substrate 104 is created, e.g., through injection molding or other manufacturing techniques. The density, dispersion, and other characteristics of the flow apertures 108 may be determined based on the desired suction for the skin, the material of the skin, and whether the suction will be applied through a field vacuum or a localized vacuum, e.g., to pull the skin substantially uniformly or in a localized manner.

The diameter and/or the shape of the flow apertures 108 may be selected based on the desired suction of the vacuum control mechanism 106. In some examples, the flow apertures 108 may also be sufficiently small to prevent sections of the skin 102 from being pulled or inserted therein. For example, the flow apertures 108 may be micro-perforated apertures within the frame that allow air molecules to be transmitted therethrough, but may prevent larger objects from being received therein. As another example, the flow apertures 108 may be sufficiently large such that portions of the skin 102 may be pulled at least into the flow apertures 108 when the vacuum pump 106 is activated, but may be removed when the vacuum is deactivated. In this case, the aperture may be shaped a particular way to create a desired structural feature in the skin, such as a dimple.

Figure 3C:
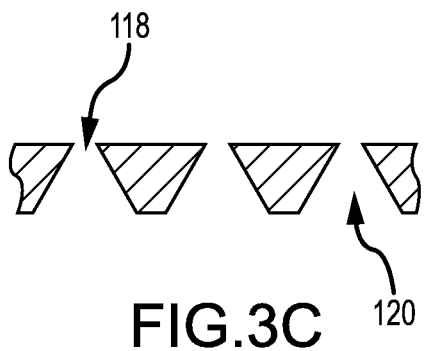
FIG. 3C is a cross-section view of the frame illustrating flow apertures with variable diameters.

The flow apertures 108 may also vary in dimension and/or shape as they extend between the top and bottom surfaces 112, 116 of the substrate 104. FIG. 3C is a cross-section view of the substrate 104 illustrating flow apertures with variable diameters. With reference to FIG. 3C, the flow apertures 108 may have an outlet 118 defined on the top surface 112 and an inlet 120 defined on the bottom surface 116. In the FIG. 3C example, the outlet 118 may have a smaller diameter than the inlet 12 such that the flow apertures 108 taper as they extend from the inlet 120 to the outlet 118. In other examples, the flow apertures 108 may taper as they extend from the outlet 118 to the inlet 120, select groups of flow apertures 108 may have varying tapers from each other, or other variations in diameter or shape. The flow apertures 108 may be dimensioned based on the desired suction and pulling forces and thus may be modified based on the material, thickness, and other properties of the skin 102. For example, in some embodiments, the flow apertures may be jagged, rounded, or may be in a pattern or shape. As a specific example, the flow apertures may be configured to replicate one or more letters, one or more words, an expression or symbol (e.g., smiley face or ampersand), or may be otherwise configured to create a desired topography in the membrane.

Figure 4:
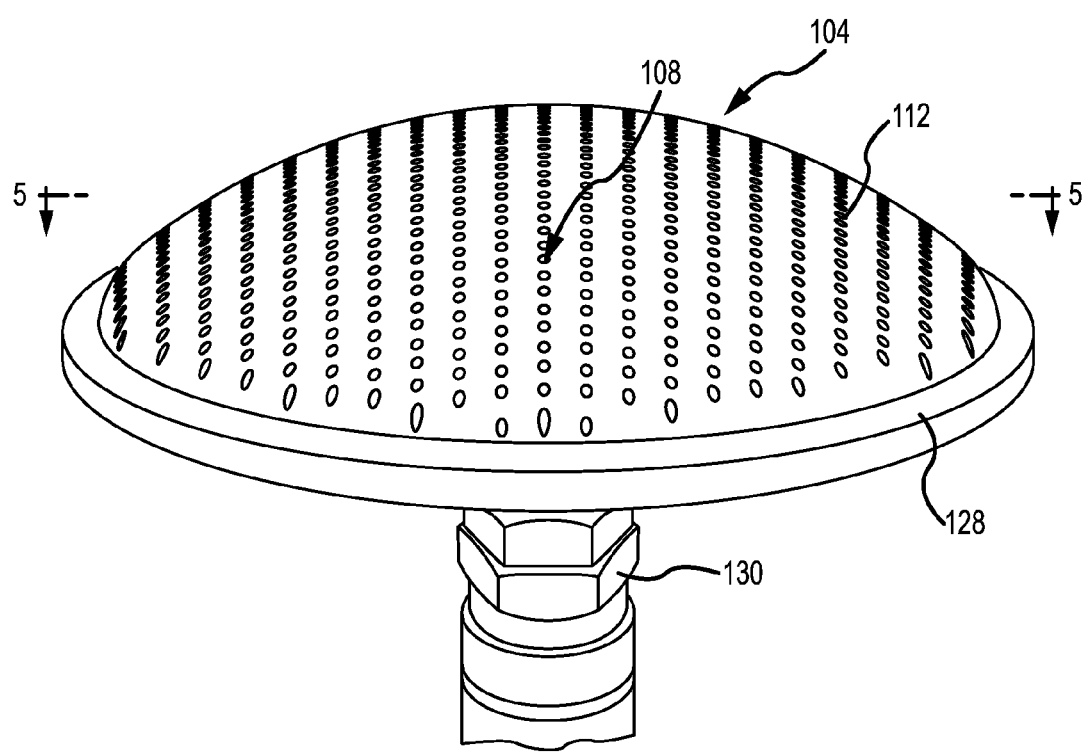
FIG. 4 is a top perspective view of the frame connected to a coupler in communication with a vacuum pump.
Figure 5:
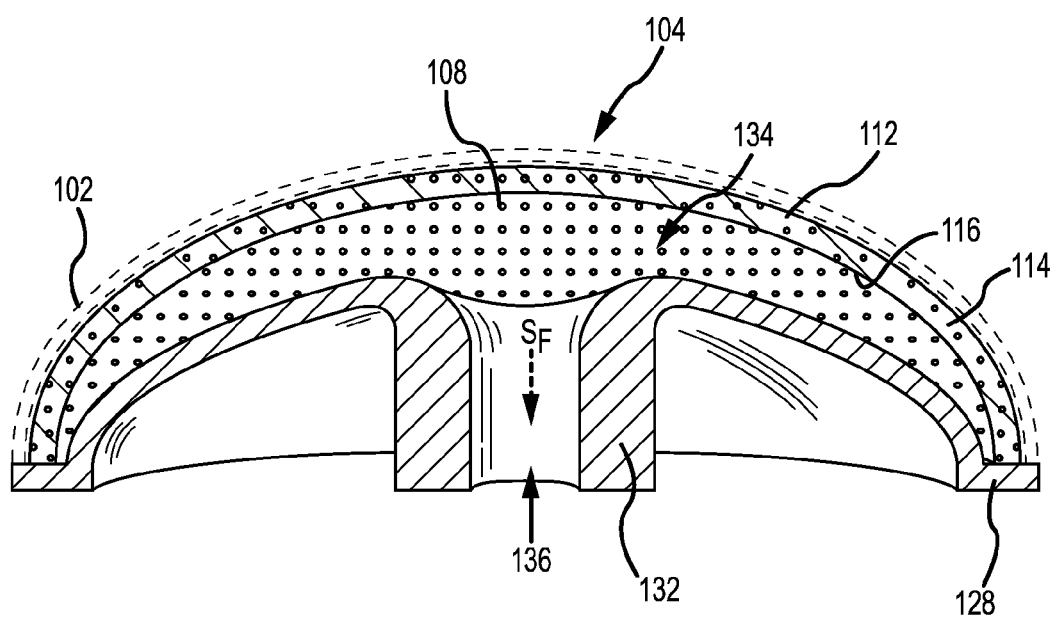
FIG. 5 is a cross-section of the frame of FIG. 4 taken along line 5-5 in FIG. 4.

Some specific examples of the substrate 104 will now be discussed in more detail. FIG. 4 is a top perspective view of the substrate 104 connected to a coupler in communication with the vacuum pump. FIG. 5 is a cross-section of the frame of FIG. 4 taken along line 5-5 in FIG. 4. In FIGS. 4 and 5, the coupler 130 may fluidly connect the substrate 104 and a seal base 128 to the vacuum pump 106 and may define a flow path between the vacuum pump 106 and the substrate 104.

With reference to FIGS. 4 and 5, the substrate 104 may have a contoured or curved shape and as shown in FIGS. 4 and 5 may have a convex shape that curves away from the seal base 128. As shown in FIG. 5, the flow apertures 108 may be substantially uniformly dispersed along the substrate 104 and may extend through the thickness of the body 114. The skin 102 (shown in dashed lines in FIG. 5) may be positioned over at least a portion of the flow apertures 108 and may cover or conceal the flow apertures 108. The skin 102 may be attached at one or more connection locations to the frame as desired, which may provide additional securing features (other than the vacuum force) to connect the skin to the frame.

The substrate 104 and the seal base 128 may be connected so as to define a vacuum cavity 134 therebetween. The seal base 128 may be integrated with the substrate 104 or separate therefrom. For example, the substrate 104 may include a hollow component, where a bottom surface of the component may define the seal base and the top component may define the shell of the frame including the flow apertures. In another example, as shown in FIG. 5, the seal base may be a separate component attached to the frame. In some examples, the seal base may be a discrete hose with the vacuum cavity being defined as the hollow pathway through the hose. In other examples, the vacuum cavity may be a region bounded by walls and in communication with a hose leading to the vacuum pump. As such, the vacuum cavity may be defined by a number of different components, the substrate the vacuum pump (e.g., through a connection hose), or a base connected to the substrate. The vacuum cavity may form a sealed or partially sealed chamber through which a suction force can be created.

The seal base 128 may be a substantially sealed or non-porous material and may include a nipple or nodule 132 defining a flow path 136 therethrough. The nipple 132 may connect to the coupler 130 to provide fluid communication between the cavity and the vacuum pump 106. Although the nipple 132 is shown extending from generally a center of the seal base 128, the nipple 132 may be positioned substantially anywhere along the seal base 128. Alternatively, the coupler 132 may be directly inserted into the vacuum cavity 134 and the nipple may be omitted. The coupler 130 may also be connected to or form a hose that may be fluidly connected to the vacuum pump.

The seal base 128 may be configured to generally trace the contours and the substrate 104. In this example, the frame and the seal base may form a top shell and a bottom shell for the vacuum control mechanism. However, in other examples, the seal base 128 may be detachable and/or form a different shape than the frame. The shape and size of the seal base and the frame may be at least partially related to the desired size and shape of the vacuum cavity 134 (which may control the suction force Sf applied to the skin 102), as well as the desired shape, structural support, and rigidity of a structure created using the substrate 104.

The vacuum cavity 134 may be in communication with the flow apertures and the vacuum pump 106. With reference to FIG. 5, when the vacuum pump 106 is activated, a suction force Sf may be applied within the vacuum cavity 134. The suction force Sf applies a pulling force on the skin 102 through the flow apertures 108. The vacuum 106 may apply a vacuum or can create a differential pressure (lower than above the skin 102) to draw the skin to the substrate, while still allowing the skin to move relative to the substrate. For example, the vacuum is applied through the sealed or partially sealed vacuum cavity 134, which due to the sealed or partially sealed chamber allows the suction force to act on the skin 102.

The portions of the skin 102 positioned above the flow apertures 108 may experience a force that pulls the skin 102 against the top surface 112 of the substrate 104. Depending on the power of the suction force Sf, portions of the skin 102 may be pulled into the flow apertures 108. The suction force Sf may increase the frictional engagement between the skin 102 and the frame, but in some instances may be configured to allow the skin 102 to move along the outer surface of the substrate 104, while remaining engaged. As one example, when the skin 102 includes the ridges 126, a seal between the skin 102 and the top surface 112 of the substrate 104 may be reduced when the vacuum is activated, which may allow the skin 102 to be retained in engagement with the substrate 104, but may allow the skin 102 to move laterally on the substrate 104. For example, the ridges or texture on the skin may reduce suction force Sf experienced by the skin, as the ridges may reduce the sealing engagement between the substrate and the skin. In this example, the skin may be able to move laterally along the surface of the substrate, but may remain at least partially engaged with the substrate. In other words, the skin may be repositioned on the substrate, but may not fall off of the substrate.

The suction force Sf is due to the vacuum created by the vacuum pump 106 as it pulls air from the cavity 134 through the flow channel 136 into the pump 106. Once the molecules have been removed, the pressure within the vacuum cavity 134 reduces, which causes molecules outside of the vacuum cavity 134 to move to the lower pressure area (within the vacuum cavity 134), thus creating the suction force Sf. In other words, the suction force Sf may be directly related to the negative pressure applied by the vacuum pump 106. Often, the magnitude of the suction force Sf may be related to the seal within the vacuum cavity. As the seal is reduced, e.g., as external air is in communication with the chamber, the suction force experienced by the skin may be reduced, as external air (such as due to a hole in the vacuum chamber) may move to the lower pressure area increasing the pressure within the cavity.

In some instances, the skin 102 may not form a sealed volume. For example, the skin 102 may have seams, holes, or other breaches. In instances where there may be a leak or hole in the skin that may reduce the seal between the skin and the substrate, the suction force Sf of the vacuum generally may be strong enough to cause the skin 102 to engage the substrate 104 over the region with apertures 108. However, the suction force Sf may be not be too strong so as to prevent the skin 102 from moving along the substrate 104, but may be strong enough to prevent the skin 102 from falling off of the substrate 104. For example, vacuum pressure or suction force Sf may be reduced in a sealed volume or an unsealed volume may be used (e.g., a "leak") in the skin. In the later example, the leak may be built into the skin or seal base 128 and function to limit the effect or reduce of the suction force Sf. As described above, leaks in either the skin or the seal base (or other portion of the vacuum cavity) may reduce the negative pressure experienced by the skin and thus reduce the suction force Sf experienced by the skin.

Figure 6A:
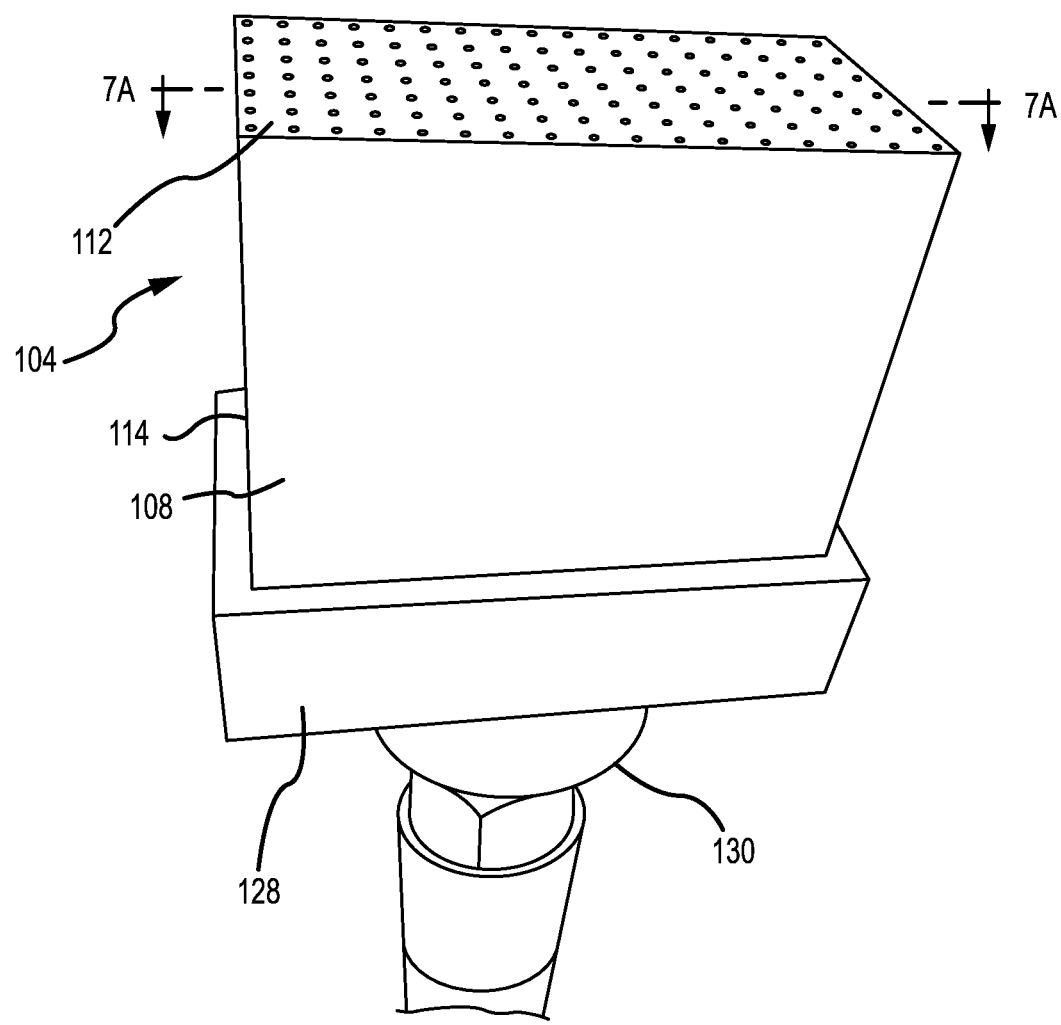
FIG. 6A it is a top perspective view of a flexible frame.
Figure 6B:
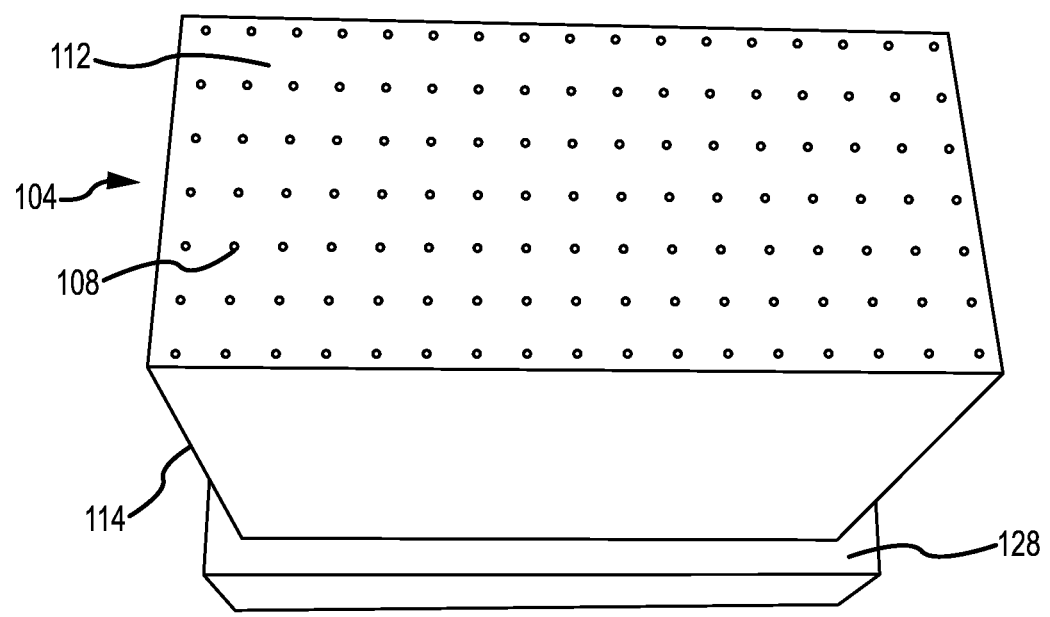
FIG. 6B is a top plan view of the frame of FIG. 6A.
Figure 7A:
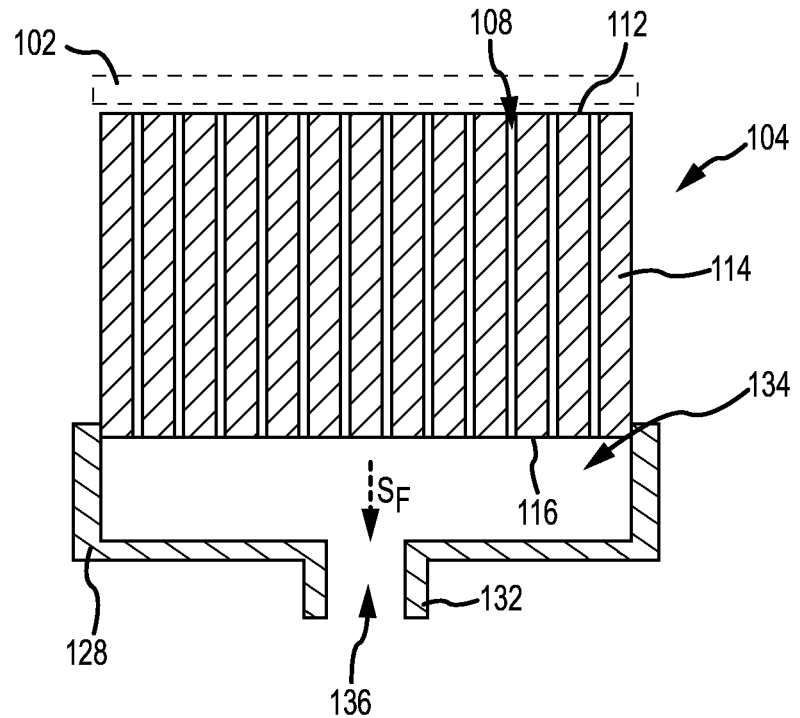
FIG. 7A is a cross-section of the frame taken along line 7A-7A in FIG. 6A.
Figure 7B:
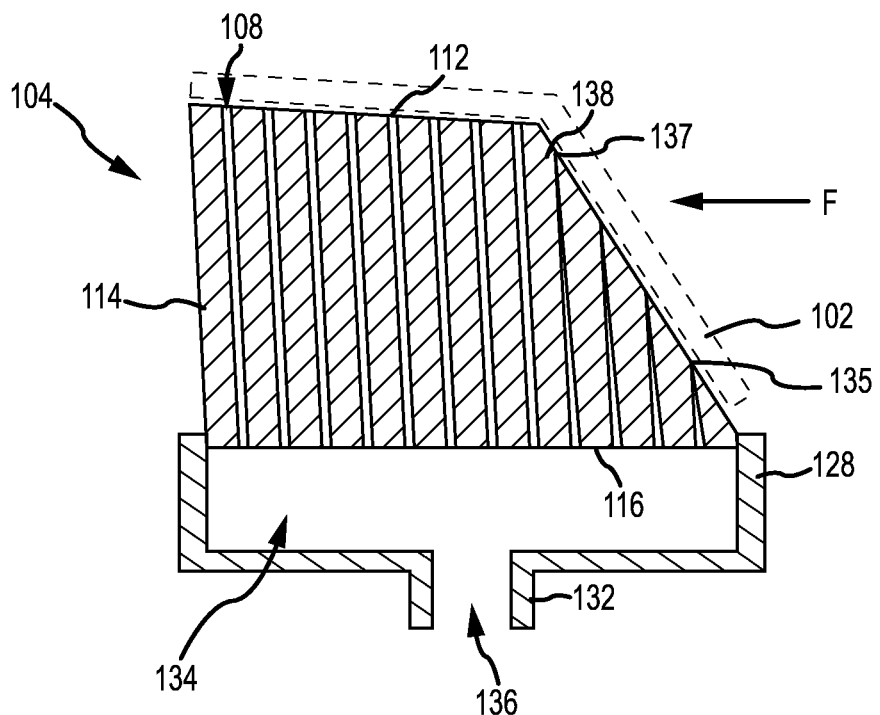
FIG. 7B is a cross-section of the frame as the frame is deformed.

As briefly discussed above, the substrate 104 may be a rigid material (as shown in FIGS. 4 and 5) or may be a flexible material. FIG. 6A it is a top perspective view of a flexible frame. FIG. 6B is a top plan view of the frame of FIG. 6A. FIG. 7A is a cross-section of the frame taken along line 7A-7A in FIG. 6A. FIG. 7B is a cross-section of the frame as the frame is deformed. With reference to FIGS. 6A-7B, the substrate 104 may include an at least partially flexible material that may be deformed and resiliently return to its original shape. In examples where the substrate 104 is at least partially flexible, the vacuum control mechanism may be used in a variety of applications where increased flexibility may be desired, such as deformable structures or the like. As one example, the flexible substrate shown in FIGS. 7A and 7B may be used to create a stomach portion of a human animatronic, an animal body, jellyfish, or other deformable or less rigid components for the object created or defined by the vacuum control mechanism.

The substrate 104 as illustrated in FIGS. 6A-7B also includes a seal base 128. The seal base 128 as shown in FIGS. 6A-7 has a separate shape as compared to the bottom surface 116 of the substrate 104. In this example, the seal base 128 may extend around and partially receive the substrate 104. In other words, the substrate may be at least partially received into the seal base and may form a top surface of the vacuum cavity 134.

With reference to FIG. 7B, a deformation force F may be applied to a side of the substrate 104. Due to the flexibility of the frame material, which may be silicon or an elastomeric material, portions of the body 114 nearest the application of the deformation force F may compress onto each other, and the substrate 104 may flex or bend in the direction of the deformation force F. As the substrate 104 bends, one or more apertures 138 closest to the force F may collapse or otherwise become restricted due the compression of the body 114. As this occurs, the restricted apertures 138 may have a reduced suction force Sf on the skin 102 as compared to the non-restricted apertures. However, other apertures in the substrate 104 may not be restricted and/or may be increased due to the deformation force F, and the skin 102 engagement with the substrate 104 may not be substantially reduced. In other words, the substrate 104 may maintain its engagement with the skin 102 due to the suction force Sf, even as the substrate 104 is deformed, bent, or flexed.

With reference to FIG. 7B, as the substrate 104 experiences the deformation force F, although some apertures may be completely collapse, a first aperture 137 may be partially open exerting some force on the skin 102 and a second aperture 135 may also be open, also exerting some force on the skin 102. In this example, the two apertures 135, 137 may act to hold the skin 102 along a length of the substrate 104 spanning between the two partially open apertures 135, 137. This allows the skin 102 to be held onto the substrate 104 by the suction force Sf, although one or more of the flow apertures may be closed or partially closed.

Figure 8A:
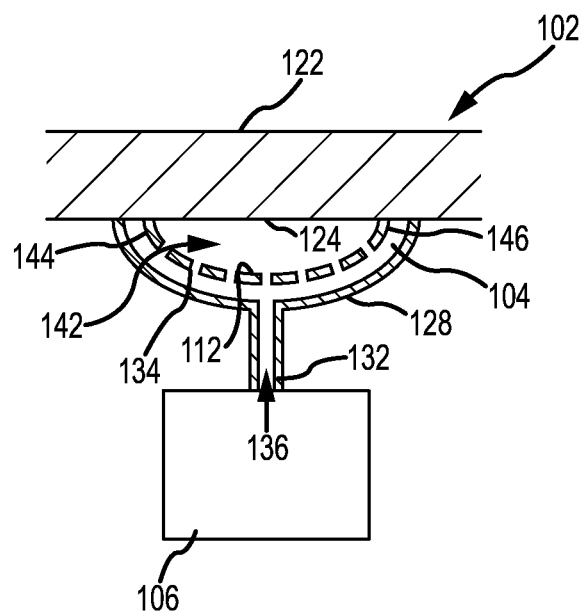
FIG. 8A is a cross-section of the vacuum control mechanism for defining a localized feature in the skin.
Figure 8B:
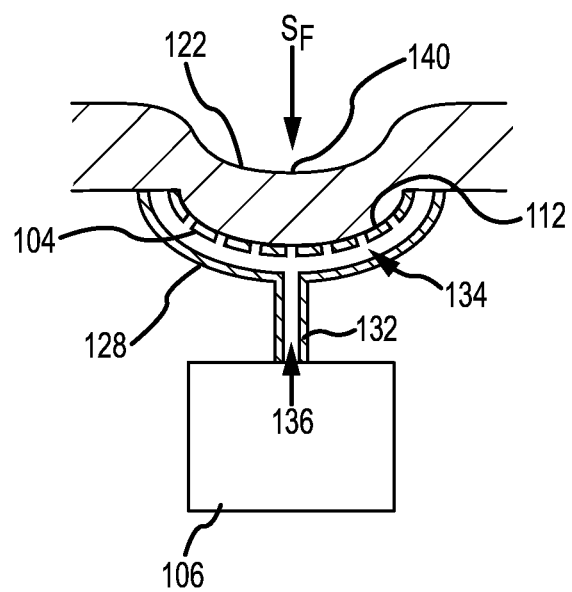
FIG. 8B is the cross-section of the vacuum control mechanism in FIG. 8A with the suction force Sf applied.

The vacuum control mechanism, and specifically the structure of the substrate 104, may be configured to exert a field of uniform vacuum on the skin 102. In these examples, the skin 102 may uniformly experience the suction force Sf and changes of the topography of the skin due to the suction force may be experienced across the entire length and/or width of the skin. However, in some examples the suction force Sf may be applied in localized areas to create localized indentations, depressions, or other features within the skin. FIG. 8A is a cross-section of the vacuum control mechanism for defining a localized feature in the skin. FIG. 8B is the cross-section of the vacuum control mechanism in FIG. 8A with the suction force Sf applied. With reference to FIGS. 8A and 8B, to create a localized feature, the skin 102 may be on in partial contact with the substrate 104. Additionally, rather than generally conforming to the shape of the substrate 104, the skin 102 may extend over the frame or otherwise be spatially separated from the substrate 104.

With reference to FIG. 8A, the skin 102 may extend from a first end 144 of the substrate 104 to a second end 146 and the substrate 104 may be concavely curved away from the bottom surface 124 of the skin 102. Thus, the skin 102 and the top surface 112 of the substrate 104 may be spaced apart from each other by a spacing distance 142. The spacing distance 142 may define the separation between the bottom surface of the skin and the top surface of the substrate 104.

With reference to FIG. 8B, to create the localized feature, the vacuum pump 106 may be activated, creating the suction force Sf as molecules are pulled through the flow pathway 136 away from the vacuum cavity 134. The suction force Sf pulls the skin 102 against the top surface 112 of the substrate 104. Because the substrate 104 may provide some structure for the skin, when the suction force is applied, the skin 102 may generally conform to the shape of the substrate 104. As the skin 102 is pulled, the spacing distance 142 may be reduced until the skin 102 engages the top of the substrate 104. Thus, the skin 102 may transition from a relatively flat topography to include an indentation 140. The indentation 140 corresponds to the shape and contours of the frame. To vary the indentation 140, the substrate 104 may be modified, as well as the suction force Sf applied. For example, reducing the suction force Sf may result in a shallower indentation 140.

It should be noted that although the localized feature, the indentation 140, in FIG. 8B is created using multiple flow apertures 108, other techniques are envisioned. For example, by increasing the size of one or more flow apertures 108, a localized feature may be created by pulling the skin 102 into the flow apertures. In this example, the indentation 140 may correspond to the shape and dimension of the flow aperture rather than the frame itself. See, for example, FIG. 12B, where a single flow aperture is used to create a localized or precisely defined and discrete indentation or feature.

Figure 9A:
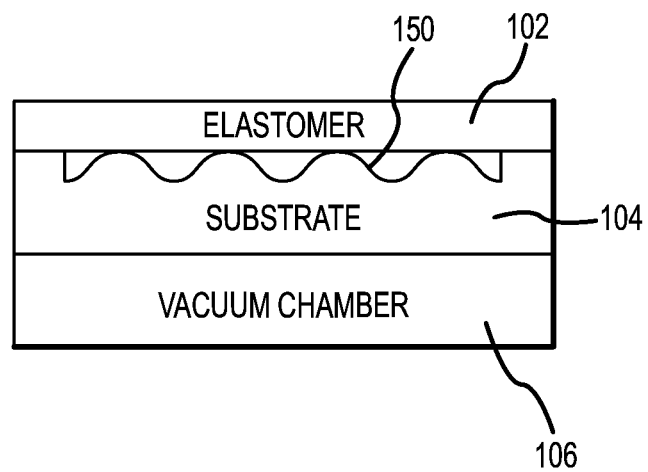
FIG. 9A is a simplified diagram of the vacuum control mechanism including a frame with a patterned top surface.
Figure 9B:
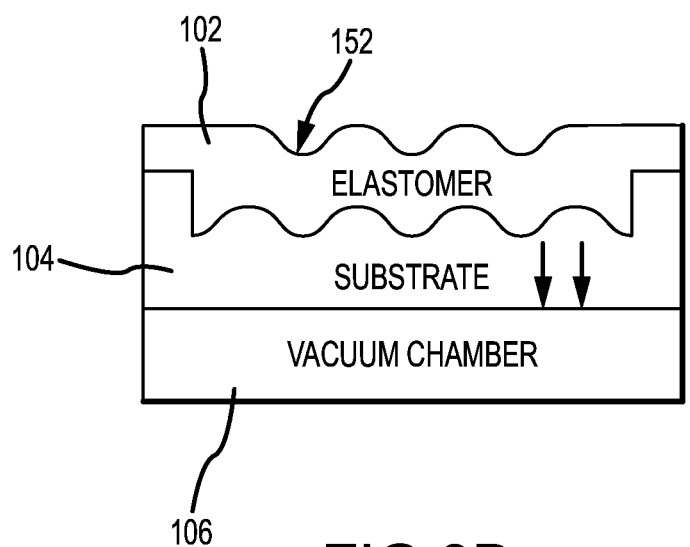
FIG. 9B is the diagram of FIG. 9A with the suction force applied to the skin.

In addition to localized features, as well as attaching the skin to the substrate, the vacuum control mechanism may also be used to vary larger sections of the skin 102. As one example, the substrate 104 may include a texture, pattern, or ridges extending therefrom and the suction force may pull the skin to conform to those features. FIG. 9A is a simplified diagram of the vacuum control mechanism including a frame with a patterned top surface. FIG. 9B is the diagram of FIG. 9A with the suction force applied to the skin. With reference to FIG. 9A, the substrate or substrate 104 may include a top surface 112 having a plurality of ridges 150, undulations, or other extensions. The ridges 150 or other features may be in the form of a pattern, random, may have varying heights, sizes, shapes, and the like. For example the ridges 150 may be configured to replicate a particular item, such as a word (raised type face), an element such as gravel, or the like. The substrate 104 may include a variety of different types of features. The features or ridges 150 may be integrally formed with the substrate 104 or may be connected to the substrate 104. The features or ridges 150 may be used to increase a coefficient of friction for the skin 102, making it easier to grip or may define a feature hidden by the skin.

With reference to FIG. 9B, when the vacuum pump 106 is activated, the suction force Sf may pull the skin 102 towards the substrate 104. As the skin 102 is pulled against the substrate 104 or frame, the flexible skin 102 may conform to the top surface 112 of the substrate 104 and thus may extend around the ridges 150 and other features. This defines a number of ridges or skin features 152 in the skin 102 and as such varies the topography of the skin 102. Because the skin 102 may be generally resilient, the deformation of the skin 102 as it conforms around the ridges 150 may be temporary and when the suction force Sf is deactivated, the skin 102 may return to its original position.

Example Applications Utilizing the Vacuum Control Mechanism

As briefly discussed above, the vacuum control mechanism 100 may be used in a variety of applications to releasably attach a skin or membrane to a frame or substrate, as well to vary the appearance or the topography of the skin or membrane. Some example applications will be discussed in more detail below. However, it should be noted that the disclosure of related applications is illustrative only and many other applications are envisioned.

Figure 10:
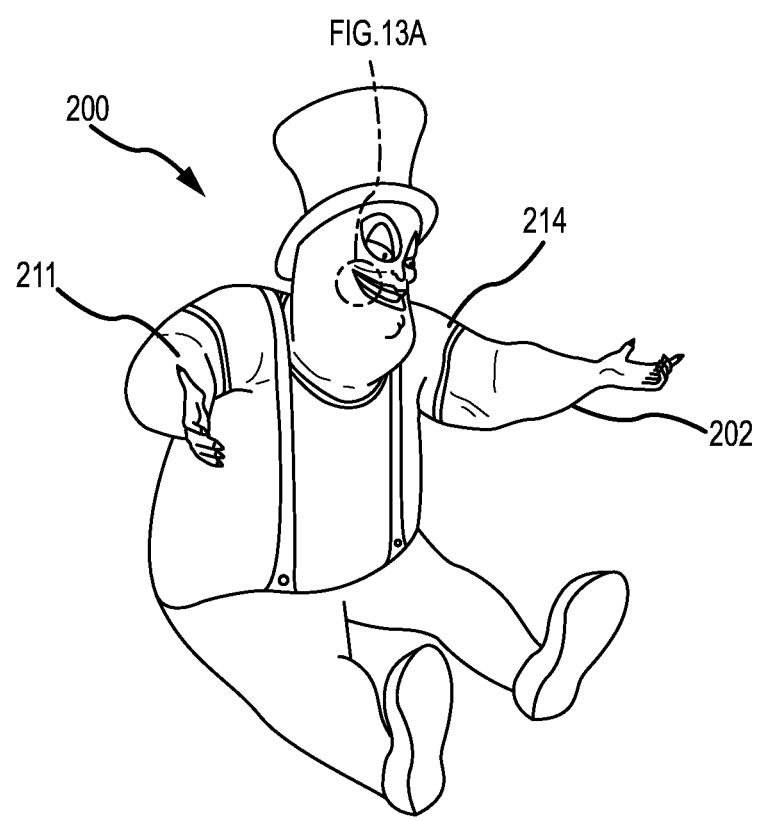
FIG. 10 is a perspective view of an animatronic robot including the vacuum control mechanism of FIG. 1.

In one example, the vacuum control mechanism 100 may be used to operably connect skin to a movable structure, such as an animatronic character. FIG. 10 is a perspective view of an animatronic robot. With reference to FIG. 10, the animatronic robot 200 may be a robotic structure that may move, display audio, and "interact" with a user. For example, in many theme parks animatronic robots 200 may be used as part of an attraction and the animatronic robot 200 may be configured as a character (such as from a movie or television show). The animatronic may include one or more movable structures 214 that may be configured to replicate one or more appendages or features of a character. Often, a plurality of the appendages or movable structures 214 may be articulable around one or more joints. The animatronic robot 200 may also include one or more speakers or other outputs that allow the robot 200 to provide audio, as well as visual, output to a user.

The vacuum control mechanism 100 may be used to attach or vary an engagement of an outer element, such as skin, to the animatronic robot 200. For example, the skin 102 may form an outer surface of the animatronic robot 200 and the substrate 104 may form at least a part of the structure of the robot 200. In some examples, the outer surface 122 of the skin 102 may be covered or coated with a finishing layer or coating. As shown in FIG. 1, the skin 102 may include a fabric (such as a woven, non-woven, or knit) attached thereto, which may provide a more realistic appearance for the character replicated by the animatronic robot 200. Other coatings and overlays may include beads, sequins, feathers, paints, or the like.

In conventional animatronic robots or other movable robots, the skin may be dimensioned to allow movement of the movable structures 214 between one or more positions and in a variety of movement directions. This may cause the skin to appear loose or baggy in certain positions. However, because the vacuum control mechanism 100 may selectively pull the skin 102 in certain directions, the animatronic robot 200 utilizing the vacuum techniques may have a more realistic skin appearance. Additionally by tightening the excess skin during certain movements, the skin may be substantially prevented from getting caught or wedged between moving elements, hinges, or the like. This may reduce the likelihood of the skin preventing or restricting movement of the robot 200.

Figure 11A:
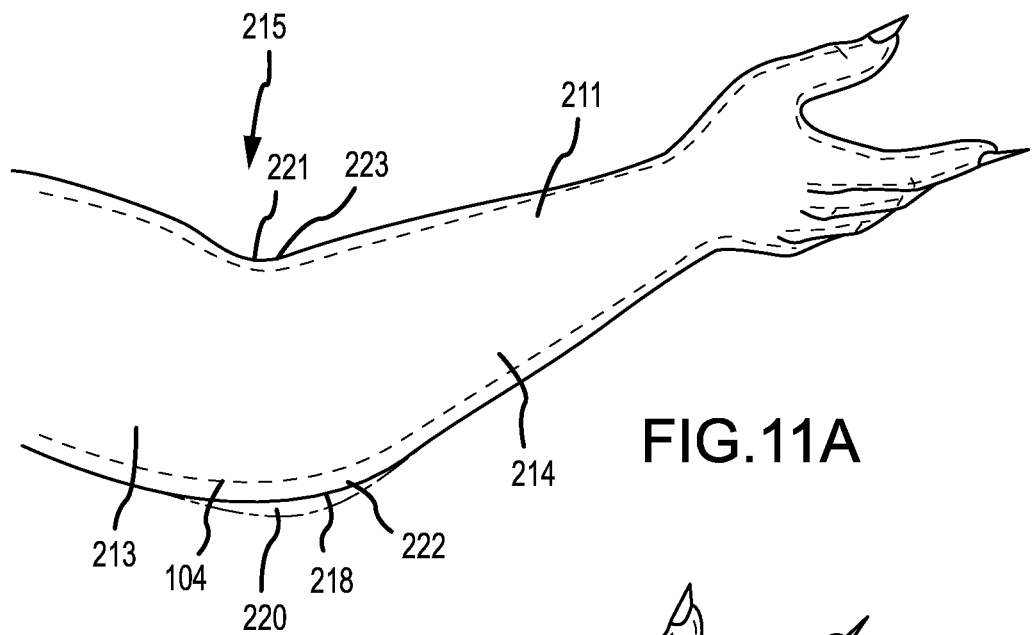
FIG. 11A is a perspective view of an arm of the animatronic robot of FIG. 10 in an extended position.
Figure 11B:
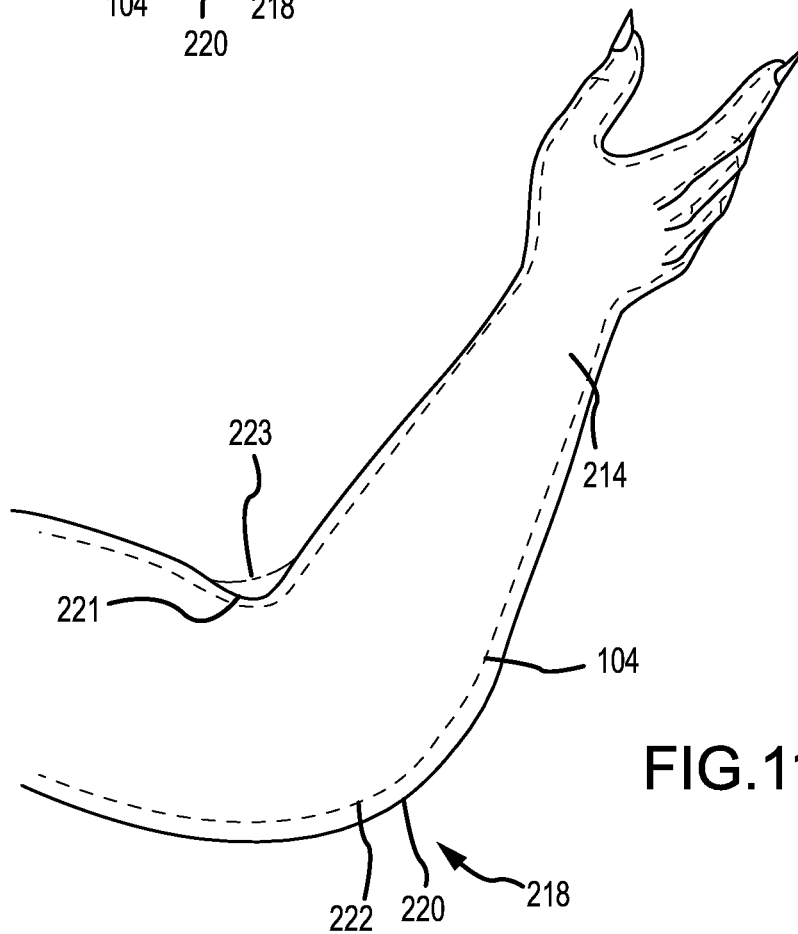
FIG. 11B is a perspective view of the arm of the animatronic robot in a bent position.

Movement of the robot and applying the suction force Sf to reduce the bagginess of the skin will now be discussed in further detail. FIG. 11A is a perspective view of an arm 214 of the robot 200 of FIG. 10 in an extended position. FIG. 11B is a perspective view of the arm 214 in a bend position. The arm 214 may include a forearm 211 and an upper arm 213, the forearm 211 may rotate at a joint or elbow 215 relative to the upper arm 213.

With reference to FIG. 11A, in the extended position, an inside portion 221 and an outside portion 218 of an elbow may include excess skin 221. The excess skin on either side of the joint allows the arm to transition between extended (FIG. 11A) and retracted (FIG. 11B) positions without breaking or tearing the skin. With reference to FIG. 11A, in the extended position, the excess skin 223 on the inside portion 221 of the elbow 215 may tighten around the substrate as the forearm 211 moves away from the upper arm 213. The movement of the forearm 211 thus takes up the excess skin as the skin stretches to accommodate the movement. However, the excess skin 220 on the outside portion 218 of the elbow 215 may become loose. As the arm moves, the vacuum pump 106 may be activated to pull the excess skin 220 towards the substrate 222. In other words, the suction force Sf tightens the excess skin 220 on the outside portion 218 of the elbow on the substrate, preventing looseness or bagginess. In other words, the skin 220 may be pulled upwards to define a taut portion 222 around the outside 218 of the elbow 215.

Now with reference FIG. 11B, as the arm transitions to a bent position, the vacuum experienced by the excess skin 220 on the outside of the elbow portion may be turned off, allowing the skin 220 to become lose, allowing the forearm to move upwards. In other words, the suction force Sf may be deactivated, providing extra flexibility for the movement of the skin. Additionally, the vacuum pump in communication with the excess skin 223 on the inside portion 221 of the joint may be activated, pulling the excess skin 223 against the frame. For example, as the forearm extends upwards, the extra skin 223 that allows for the extension of the arm may become loose or baggy around the joint. As the vacuum is activated, the excess skin 223 on the inside portion 221 of the elbow by be pulled downwards to become taut around the elbow.

It should be noted that although the examples in FIGS. 11A and 11B illustrate movement of an arm, the vacuum techniques may be applied to many other movable joints on the character, such as, but not limited to, a chin, a knee, an ankle, one or more finger joints, facial expressions and movements, and so on. Additionally, the type of suctioning required and the placement of the flow apertures may be varied based on the structure of the robot 200, as well as the movement and desired tightness of the skin. Moreover, it should be appreciated that the dashed lines of excess skin illustrate the position of the skin before the vacuum has been applied.

Figure 12A:
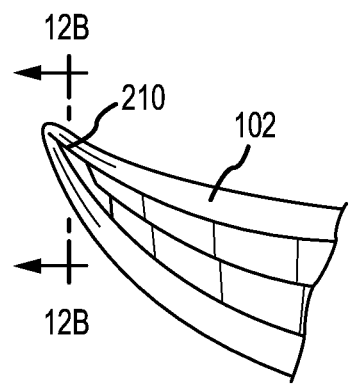
FIG. 12A is an enlarged view of the animatronic robot of FIG. 11 illustrating a facial feature.

The vacuum control mechanism may also be used to define one or more features on the robot 200 or character. For example, using the localized vacuum technique described above with respect to FIGS. 8A and 8B, one or more dimples, wrinkles, depressions or the like may be selectively formed on the animatronic robot 200. FIG. 12A is an enlarged view of the animatronic robot 200 of FIG. 11. As shown in FIG. 12A, a dimple 210 or other localized feature, such as a crease, may be formed by applying the suction force Sf to a small area of the skin 102. As one example, as the animatronic robot 200 is moving, such as to replicate talking or facial features, the dimple 210 or crease may be selectively activated to enhance the facial features and provide a life-like appearance to the robot 200.

Figure 12B:
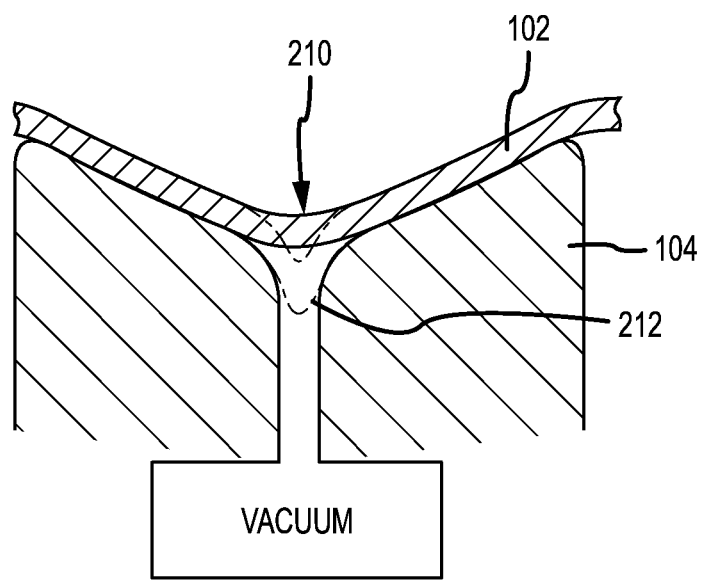
FIG. 12B is an enlarged cross-section view of the animatronic robot taken along line 13B-13B in FIG. 12A.

FIG. 12B is an enlarged cross-section view of the robot taken along line 13B-13B in FIG. 12A. As shown in FIG. 12B, the dimple may be created as the skin 102 may be pulled into one of the flow apertures 108. The vacuum may be selectively activated to pull the skin downwards in a localized manner, such as in response to a movement that may replicate the robot 200 smiling. By selectively activating the vacuum, the facial feature may be illustrated in the skin, as well as movement within the mouth aperture.

In this example, the flow aperture 108 may have a sufficiently large diameter such that as the skin is pulled into the aperture 108, the depression may be viewable by a user. In other words, the size of the flow aperture may be selected to generally correspond to the size of the desired local depression. It should be noted that although FIG. 12B illustrates a single flow aperture, the technique illustrated in FIG. 8B may also be used, which uses a series of smaller flow apertures to collectively pull the skin in a specific area. The technique and/or size of the flow apertures may depend on the desired diameter and angle of the depression or dimple 210.

Figure 12C:
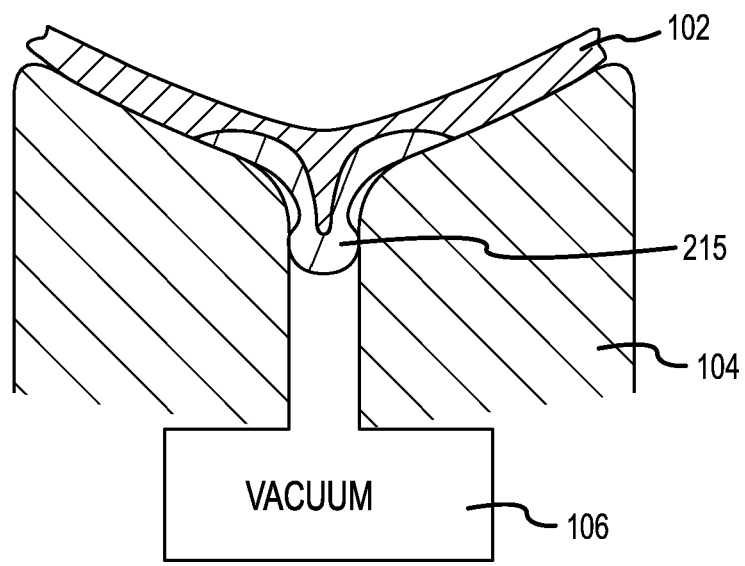
FIG. 12C is an enlarged cross-section view of the animatronic robot illustrating another example of the skin prior to the suction force of the vacuum being activated.
Figure 12D:
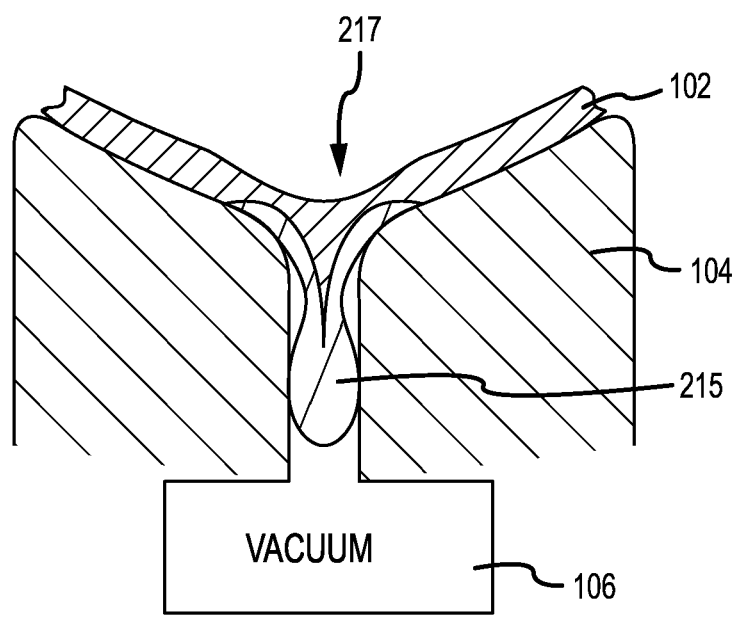
FIG. 12D is an enlarged cross-section view similar to FIG. 12C, with the suction force being activated.

As briefly discussed above, in some examples, the skin 102 may include a tang connected thereto. FIG. 12C is a cross-section view similar to FIG. 12B illustrating the skin 102 including a tang 215. FIG. 12D is a cross-section illustrating the example in FIG. 12C with the suction force of the vacuum being applied to the skin. The tang 215 may be bonded to the skin during formation of the skin or after the skin has been formed. The tang 215 may be more durable than the skin and may have an increased durometer as compared to the skin 102. In these implementations, the tang 215 may be a stronger material than the skin 102 and as such may be positioned over the flow aperture 108 to experience a majority of the suction force. By having the tang 215 experience more of the suction force, the skin may be less likely to wear over time and have an increased repeatability as compared to non-tang implementations.

With reference to FIG. 12C, the tang 215 may be partially received within the flow aperture 108 prior to the vacuum being activated. With reference to FIG. 12D, as the suction force Sf is applied by the vacuum 106, the tang 215 may be pulled further into the flow aperture 108 and may become elongated. Because the tang 215 is connected to the skin 102, as the tang 215 is pulled by the suction force Sf, the tang may create a localized indentation 217 in the top layer of the skin 102. Depending on the thickness of the tang 215, the indentation 217 may not be as deep as implementations where the skin 102 does not include the tang. However, to increase the indentation 217, the diameter of the flow aperture may be increased and/or the size of the tang 215 may be decreased.

The increased durometer of the tang 215 may allow the tang to better withstand repeated applications of the suction force Sf and may enhance the life of the vacuum control mechanism. For example, the vacuum control mechanism may be used to create animatronic robots and particular features (such as a dimple, wrinkle, or smile) may be activated thousands of times per day. By increasing the strength of the material where the vacuum forces may be repeatedly applied the life of the robot of the robot may be increased.

Figure 13:
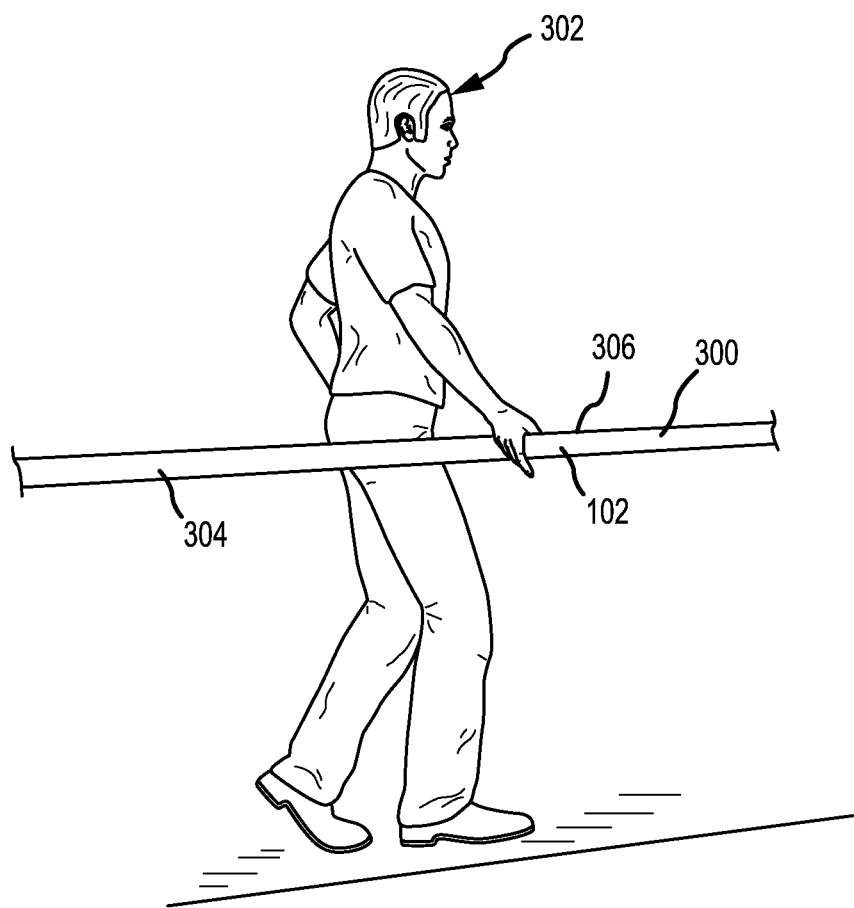
FIG. 13 is a perspective view of a user gripping a handrail incorporating the vacuum control mechanism.

In another example, the vacuum control mechanism 100 may be used to provide tactile feedback to a user. FIG. 13 is a perspective view of a user 302 gripping a handrail 300 including the skin 102. With reference to FIG. 13, the vacuum control mechanism 100 may be configured to vary the texture of the skin 102 between a first rail 304 and a second rail 306. The two rails 304, 306 may be an integral structure formed with the substrate 104, but the vacuum control mechanism may selectively apply the suction force Sf to the skin 102 at the second rail 306. Thus, as a user is gripping the rail 300, the texture of the rail 300 may change, although the rail itself has not changed. The variation in texture may be correlated to a visual output (e.g., walking from a first themed room into a second themed room) to audio output, or the like. Alternatively or additionally, the skin 102 may be modified to provide an enhanced gripping surface, for certain users or based on environmental conditions (e.g., when the rail is wet). As on implementation, when the rail becomes wet, the vacuum may be activated to cause the membrane to be sucked against a textured substrate, which causes the outer surface of the railing to become textured, enhancing a frictional coefficient between the user's hand and the rail.

In one implementation, the first rail 304 may have a relatively smooth texture that may feel like a smooth plastic or glass and the second rail 306 (with the skin 102 modified via the vacuum and frame) may have a texture that feels like wood (e.g., longitudinal ridges and rough surface). As another example, the textures of both rails may be changed to match each other. In some embodiments, the vacuum pump may be activated in a rhythmic or pulsating manner, rather than discrete changes. In other words, the vacuum pump may dynamically and constantly be activated to vary the topography of the skin. Using a pulsating vacuum, the topography or texture of the rails may feel as a living being or organic component. For example, the vacuum may cause the skin or membrane to pulse in a wave-like manner to appear life-like or as a fluid is flowing through or over the rail. The pulsating of the vacuum may be set to correspond to another output (e.g., audio/visual output) or may be separate therefrom.

Figure 14:
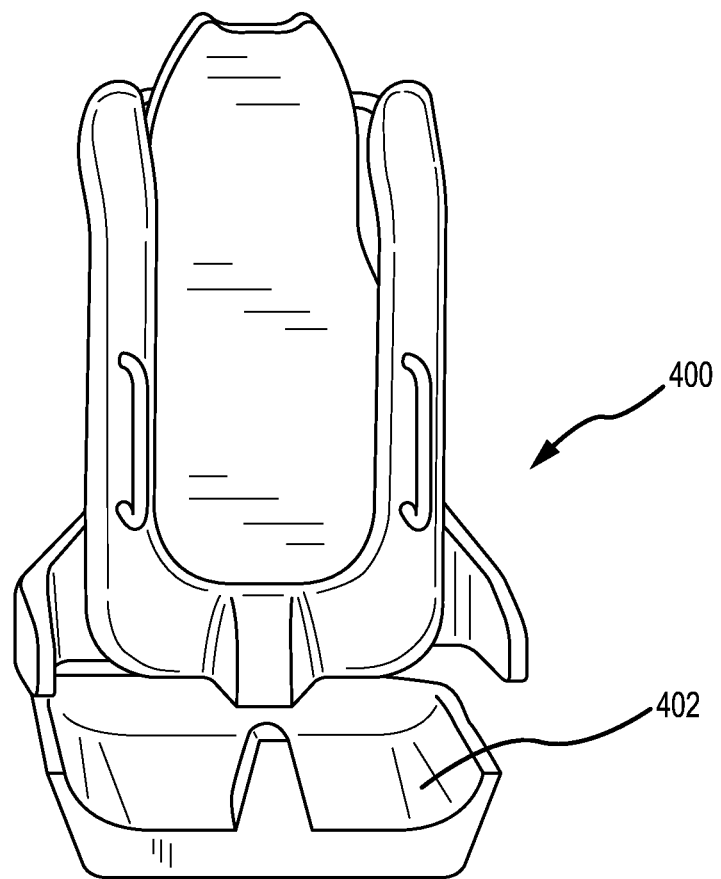
FIG. 14 is a front perspective view of a seat for an amusement ride, such as a roller coaster, incorporating the vacuum control mechanism.

In yet another example, the vacuum control mechanism may be used to create a user seat or chair. FIG. 14 is a front perspective view of a seat 400 for an amusement ride, such as a roller coaster. The seat 400 may include a user engagement surface 402, which may form the platform or sections where a user sits on top of. With reference to FIGS. 14, 9A, and 9B, the engagement surface 402 may include the skin 102 positioned on top of a textured substrate 104. The skin 102 for the engagement surface 402 may be selectively puled towards the substrate or substrate 104, which may vary the texture experienced by the user. For example, the engagement surface 402 may transform from a relatively planar feeling surface to a textured or otherwise non-planar surface.

In one implementation, the engagement surface 402 may be configured to transform from a smooth surface to a rough "gravel-like" surface. The transformation may activated when the amusement ride enters a certain section or when other output is varied (such as when a certain scene in a movie activated). In another implementation, the skin 102 may include flow apertures defined therethrough or the user may be seated directly on the substrate 104. In this example, the user may be "sucked" against the frame when the vacuum is activated to provide feedback or a user experience while sitting on the seat 400.

CONCLUSION

The foregoing description has broad application. For example, while examples disclosed herein may focus on robotic or movable structures, it should be appreciated that the concepts disclosed herein may be used in many other applications to vary a user interaction or outward appearance. Additionally, although the various examples may be discussed with respect to an outer surface or skin the techniques and structures may be implemented for a variety of layers or structures where controlled tension or attachment to a support structure may be desired. Accordingly, the discussion of any example is meant only to be an example and is not intended to suggest that the scope of the disclosure, including the claims, is limited to these examples.

What is claimed is:

1. A method for varying a topography of a material comprising:
   mounting a substantially flexible material to a vacuum substrate, wherein the substrate defines a plurality of flow apertures defined throughout a substantial portion of the substrate and a vacuum cavity, wherein the flow apertures vary in at least one of shape or size from one surface of the vacuum substrate to a second surface of the vacuum substrate; and selectively activating a vacuum in fluid communication with the flow apertures and the vacuum cavity, wherein activating the vacuum causes a pressure change in the substrate and draws at least a part of the flexible material against the substrate, wherein due to a positioning of the plurality of flow apertures, the pressure change is applied substantially uniformly to the flexible material.

2. The method of claim 1, wherein the vacuum substrate has a non-planar surface.

3. The method of claim 1, wherein activating the vacuum causes the flexible material to be drawn into a recess formed in the vacuum substrate.

4. The method of claim 3, wherein while the vacuum is activated at least a portion of the flexible material conforms to a shape of the vacuum substrate.

5. The method of claim 1, wherein the vacuum substrate is at least partially flexible.

6. The method of claim 1, wherein the substrate further comprises:
 a seal base, wherein the vacuum cavity is defined in part by the seal base; and
 the seal base defines a flow path between the vacuum cavity and the vacuum.

7. A method for varying a topography of a material, comprising
 mounting a substantially flexible material to a vacuum substrate, wherein
  the substrate comprises a plurality of flow apertures and a vacuum cavity; and
  the flexible material comprises a first material having a first durometer and a second material having a second durometer, wherein the first durometer is softer than the second durometer; and
 selectively activating a vacuum in fluid communication with the flow apertures and the vacuum cavity, wherein activating the vacuum causes a pressure change in the substrate and draws at least a part of the flexible material against the substrate.

8. The method of claim 7, wherein when the vacuum is activated, the second material is drawn against the substrate and is partially pulled into at least one of the flow apertures.

9. A movable robotic structure comprising:
 a frame;
 an outer skin connected to at least a portion of the frame and including a tang connected thereto; and
 a vacuum source in fluid communication with the outer skin; wherein
 activating the vacuum source substantially pulls at least a part of the outer skin into engagement with an outer surface of the frame and pulls at least part of the outer skin into an aperture to define a localized feature on the outer skin.

10. The movable robotic structure of claim 9, wherein the tang has a durometer rating that is different than a durometer rating of the outer skin.

11. A vacuum control mechanism, comprising:
 a porous substrate having a first surface, a bottom surface, and a plurality of micro-perforated apertures extending between the first surface and the bottom surface;
 a membrane extending over at least a portion of the first surface, wherein the membrane comprises a first material having a first durometer and a second material having a second durometer;
 a pump in fluid communication with the membrane via the plurality of micro-perforated apertures and configured to produce a suction force; wherein
 the suction force is applied substantially uniformly across the membrane and pulls the membrane closer to the first surface of the porous substrate.

12. The vacuum control mechanism of claim 11, wherein the membrane is a flexible material.

13. The vacuum control mechanism of claim 11, further comprising a coating applied to an outer surface of the membrane.

14. The vacuum control mechanism of claim 11, wherein the suction force forces the membrane to follow a topography of the porous substrate.

15. The vacuum control mechanism of claim 14, wherein the topography includes at least one recess.

16. The vacuum control mechanism of claim 11, wherein the second material forms a tail extending from the first material.

\* \* \* \* \*